(12) United States Patent
Hu et al.

(10) Patent No.: US 9,693,092 B2
(45) Date of Patent: Jun. 27, 2017

(54) METHOD AND SYSTEM FOR TRANSMITTING NETWORK VIDEO

(71) Applicant: Huawei Technologies Co., Ltd., Shenzhen, Guangdong (CN)

(72) Inventors: Yinliang Hu, Nanjing (CN); Congjuan Li, Nanjing (CN); Jinhui Zhang, Nanjing (CN); Jian Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 14/316,562

(22) Filed: Jun. 26, 2014

(65) Prior Publication Data

US 2014/0317671 A1 Oct. 23, 2014

Related U.S. Application Data

(63) Continuation of application No. PCT/CN2012/083358, filed on Oct. 23, 2012.

(30) Foreign Application Priority Data

Dec. 28, 2011 (CN) .......................... 2011 1 0448651

(51) Int. Cl.
*H04L 29/08* (2006.01)
*H04N 21/63* (2011.01)
(Continued)

(52) U.S. Cl.
CPC ..... *H04N 21/4331* (2013.01); *H04L 65/4084* (2013.01); *H04L 67/1021* (2013.01);
(Continued)

(58) Field of Classification Search
CPC ........... H04N 7/17336; H04N 7/17318; H04N 21/4331; G11B 27/105; H04L 65/4084; H04L 67/1021; H04L 67/2814
(Continued)

(56) References Cited

U.S. PATENT DOCUMENTS 7,080,158 B1 * 7/2006 Squire ................. H04L 67/2814
370/389
7,139,813 B1 * 11/2006 Wallenius ......... G06F 17/30855
375/E7.008
(Continued)

FOREIGN PATENT DOCUMENTS

CN 101119357 A 2/2008
CN 101119359 A 2/2008
(Continued)

*Primary Examiner* — Sumaiya A Chowdhury

(57) ABSTRACT

Embodiments of the present invention disclose a method includes: sending, by a terminal device, video server name information in video request information to a local domain name server; receiving, by the terminal device, address information of a buffer sent by the local domain name server, and sending the video request information to the buffer according to the address information of the buffer; detecting whether a video resource corresponding to video identification information in the video request information exists in the buffer; and if the video resource corresponding to the video identification information exists in the buffer, sending, by the buffer, the video resource to the terminal device. The present invention is applicable to transmission of a network video resource.

13 Claims, 7 Drawing Sheets

(51) Int. Cl.
    *H04L 29/12*     (2006.01)
    *H04N 21/433*     (2011.01)
    *H04N 21/61*     (2011.01)
    *H04L 29/06*     (2006.01)
    *H04N 21/2225*     (2011.01)
    *H04N 21/239*     (2011.01)
    *H04N 21/45*     (2011.01)
    *H04N 21/647*     (2011.01)

(52) U.S. Cl.
    CPC ..... *H04L 67/2814* (2013.01); *H04N 21/2225* (2013.01); *H04N 21/2393* (2013.01); *H04N 21/45* (2013.01); *H04N 21/6125* (2013.01); *H04N 21/64761* (2013.01); *H04L 61/1511* (2013.01); *H04N 21/63* (2013.01)

(58) Field of Classification Search
    USPC ............................. 725/91–92, 114, 115, 145
    See application file for complete search history.

(56) References Cited

U.S. PATENT DOCUMENTS

| | | | | |
|---|---|---|---|---|
| 7,437,482 | B2* | 10/2008 | Jungck | H04L 47/10 |
| | | | | 709/229 |
| 2001/0052016 | A1 | 12/2001 | Skene et al. | |
| 2008/0037530 | A1 | 2/2008 | Maul et al. | |
| 2008/0063113 | A1 | 3/2008 | Gao et al. | |
| 2009/0132640 | A1* | 5/2009 | Verma | G06F 17/30864 |
| | | | | 709/203 |
| 2010/0250656 | A1 | 9/2010 | Kisel et al. | |

FOREIGN PATENT DOCUMENTS

| | | | | |
|---|---|---|---|---|
| CN | 101119395 | A | 2/2008 | |
| CN | 101360105 | * | 2/2009 | ............. H04L 12/56 |
| CN | 101360105 | A | 2/2009 | |
| CN | 101984637 | A | 3/2011 | |
| CN | 102111685 | A | 6/2011 | |
| WO | WO 2010/099367 | A2 | 9/2010 | |

\* cited by examiner

METHOD AND SYSTEM FOR TRANSMITTING NETWORK VIDEO

CROSS-REFERENCE TO RELATED APPLICATIONS

This application is a continuation of International Application No. PCT/CN2012/083358, filed on Oct. 23, 2012, which claims the priority to Chinese Patent Application No. 201110448651.3, filed on Dec. 28, 2011, both of which are hereby incorporated by reference in their entireties.

TECHNICAL FIELD

The present invention relates to the field of Internet technologies, and in particular, to a method and a system for transmitting a network video.

BACKGROUND

With development of Internet technologies and gradual expansion of a network video market, more users can obtain network video services. However, an increase in network video users leads to a sharp increase in network video traffic. The sharply increasing network video traffic occupies a large number of network resources. For example, during a peak period, a majority of network bandwidth in North America is occupied by the network video traffic, and metropolitan area networks, backbone networks, and network devices such as network routers are under great operation pressure. Meanwhile, the sharply increasing network video traffic compromises user experience of an existing network video. Especially during the peak period, users often encounter problems such as intermittent stop and artifacts when watching a video.

A rough procedure of a method for deploying a buffer in a network to assist in network video transmission is as follows: a buffer near a user is used to buffer a video resource, and a network router receives a video request sent by the user, re-encapsulates the video request, and then sends the re-encapsulated video request to the buffer; after decapsulating the video request, the buffer obtains the video resource according to a packet obtained by the decapsulation; if the buffer has buffered the video resource requested by the user, the buffer immediately responds to the user and sends the video resource; if the buffer has not buffered the video resource requested by the user, the buffer connects to a video server, downloads the video resource, and then provides the video resource for the user.

In a process of implementing the present invention, the inventor finds that at least the following problems exist in the prior art: In the process of processing the video request, data processing costs of the network router and the buffer are high; when the buffer has not buffered the video resource requested by the user, the buffer needs to connect to the video server and obtain the video resource, during which a terminal device needs to wait for a long time and user experience is inferior.

SUMMARY

Embodiments of the present invention provide a method and a system for transmitting a network video to reduce data processing costs of a network router and a buffer, shorten waiting time of a terminal device, and improve user experience.

According to one aspect of the embodiments of the present invention, a method for transmitting a network video includes:

sending, by a terminal device, video server name information in video request information to a local domain name server, so that the local domain name server parses the video server name information to obtain address information of a buffer corresponding to the video server name information;

receiving, by the terminal device, the address information of the buffer sent by the local domain name server, and sending the video request information to the buffer according to the address information of the buffer; and if a video resource corresponding to video identification information exists in the buffer, sending, by the buffer, the video resource to the terminal device; or if a video resource corresponding to video identification information does not exist in the buffer, sending, by the buffer, redirection information to the terminal device; and obtaining, by the terminal device, the video resource corresponding to the video identification information from a video server according to the redirection information.

According to another aspect of the embodiments of the present invention, a terminal device includes:

a first sending module, a first receiving module, a second sending module, a third sending module, and a video receiving module, where:

the first sending module is configured to send video server name information in video request information to a local domain name server;

the first receiving module is configured to receive address information of a buffer sent by the local domain name server, or receive address information of a manager sent by the local domain name server;

the second sending module is configured to send the video request information to the buffer according to the address information of the buffer;

the third sending module is configured to send the video request information to the manager according to the address information of the manager; and the video receiving module is configured to: if a video resource corresponding to video identification information in the video request information exists in the buffer, receive the video resource corresponding to the video identification information from the buffer; or, if a video resource corresponding to video identification information in the video request information does not exist in the buffer, obtain the video resource corresponding to the video identification information from a video server according to address information of the video server and the video identification information in redirection information.

According to still another aspect of the embodiments of the present invention, a local domain name server includes:

a third receiving module, a first parsing module, and a fourth sending module, where:

the third receiving module is configured to receive video server name information sent by a terminal device;

the first parsing module is configured to parse the video server name information to obtain address information of a buffer; and the fourth sending module is configured to send the address information of the buffer or address information of a manager to the terminal device.

According to still another aspect of the embodiments of the present invention, a manager includes a fourth receiving module, an obtaining module, a first filtering module, and a fifth sending module, where:

the fourth receiving module is configured to receive video request information sent by a terminal device;

the obtaining module is configured to obtain video resource information and load ratio information stored in multiple buffers;

the first filtering module is configured to: according to video identification information in the video request information sent by the terminal device and the video resource information stored in all the buffers, obtain all buffers that have a video resource corresponding to the video identification information;

the second filtering module is configured to obtain a buffer with a lowest load ratio according to the load ratio information of the multiple buffers, or obtain a buffer with a lowest load ratio among all the buffers that have the video resource corresponding to the video identification information according to the load ratio information of all the buffers; and the fifth sending module is configured to send the video request information to the buffer with the lowest load ratio, or to the buffer with the lowest load ratio among all the buffers that have the video resource corresponding to the video identification information.

According to still another aspect of the embodiments of the present invention, a buffer includes a fifth receiving module, a detecting unit, a sixth sending module, a seventh sending module, a sixth receiving module, a seventh receiving module, and an eighth sending module, where:

the fifth receiving module is configured to receive video request information sent by a terminal device or the video request information sent by a manager;

the detecting unit is configured to: according to video identification information in the video request information, detect whether a video resource corresponding to the video identification information exists in a buffer;

the sixth sending module is configured to: if the video resource corresponding to the video identification information exists in the buffer, send the video resource to the terminal device;

the seventh sending module is configured to: if the video resource corresponding to the video identification information does not exist in the buffer, send video server name information in the video request information to a secondary domain name server;

the sixth receiving module is configured to receive address information of a video server sent by the secondary domain name server;

the seventh receiving module is configured to obtain the video resource corresponding to the video identification information in the video server according to the address information of the video server and the video identification information; and the eighth sending module is configured to send redirection information to the terminal device, where the redirection information includes the address information of the video server and the video identification information.

According to still another aspect of the embodiments of the present invention, a secondary domain name server includes an eighth receiving module, a third parsing module, and a ninth sending module, where:

the eighth receiving module is configured to receive video server name information sent by a buffer;

the third parsing module is configured to obtain address information of a video server according to the video server name information; and the ninth sending module is configured to send the address information of the video server to the buffer.

According to yet another aspect of the embodiments of the present invention, a system for transmitting a network video includes a terminal device, a local domain name server, a buffer, and a secondary domain name server, where:

the terminal device is configured to: send video server name information in video request information to the local domain name server, receive address information of a buffer or of a manager sent by the local domain name server, and then send the video request information to the buffer according to the address information of the buffer; if a video resource corresponding to video identification information exists in the buffer, receive the video resource corresponding to the video identification information from the buffer, or if a video resource corresponding to the video identification information does not exist in the buffer, receive redirection information sent by the buffer, and obtain the video resource corresponding to the video identification information from a video server according to address information of the video server and the video identification information in the redirection information;

the local domain name server is configured to: receive the video server name information sent by the terminal device, parse the video server name information to obtain the address information of the buffer or the address information of the manager, and then send the address information of the buffer or the address information of the manager to the terminal device;

the buffer is configured to: receive the video request information sent by the terminal device or the video request information sent by the manager, and, according to the video identification information in the received video request information, detect whether the video resource corresponding to the video identification information exists in the buffer; if the video resource corresponding to the video identification information exists in the buffer, send the video resource to the terminal device, or, if the video resource corresponding to the video identification information does not exist in the buffer, send the video server name information in the video request information to the secondary domain name server, receive the address information of the video server sent by the secondary domain name server, obtain the video resource corresponding to the video identification information from the video server according to the address information of the video server and the video identification information in the video request information, and send the redirection information to the terminal device; and the secondary domain name server is configured to receive the video server name information sent by the buffer, obtain the address information of the video server according to the video server name information, and send the address information of the video server to the buffer.

In the method and the system for transmitting a network video according to the embodiments of the present invention, a local domain name server instead of a network router is used to parse video request information sent by a user. If a video resource required by the video request information sent by the user does not exist in a buffer, a secondary domain name server parses the video request information again, and the buffer sends data to a terminal device of the user, a secondary domain name server parses the video request information again, and the buffer sends data to a terminal device of the user, so that the terminal device of the user is directly connected to a video server.

Optionally, in a parsing process, only information segments that need to be processed is parsed. Optionally, a proper buffer may further be selected, by using a manager, for the user according to running conditions of each buffer.

Compared with the prior art, in the embodiments of the present invention, the local domain name server instead of the network router is used to parse the video request information sent by the user, thereby reducing a running load of the network router; because only specified information segments in the video request information are parsed, costs consumed in the parsing process are reduced; when the required video resource does not exist in the buffer, the terminal device of the user is directly connected to the video server to obtain the video resource, thereby shortening waiting time for the user, preventing a black screen that may occur due to long waiting time, and improving user experience; the buffers are scheduled properly by using the manager, thereby improving a load capability of the system.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
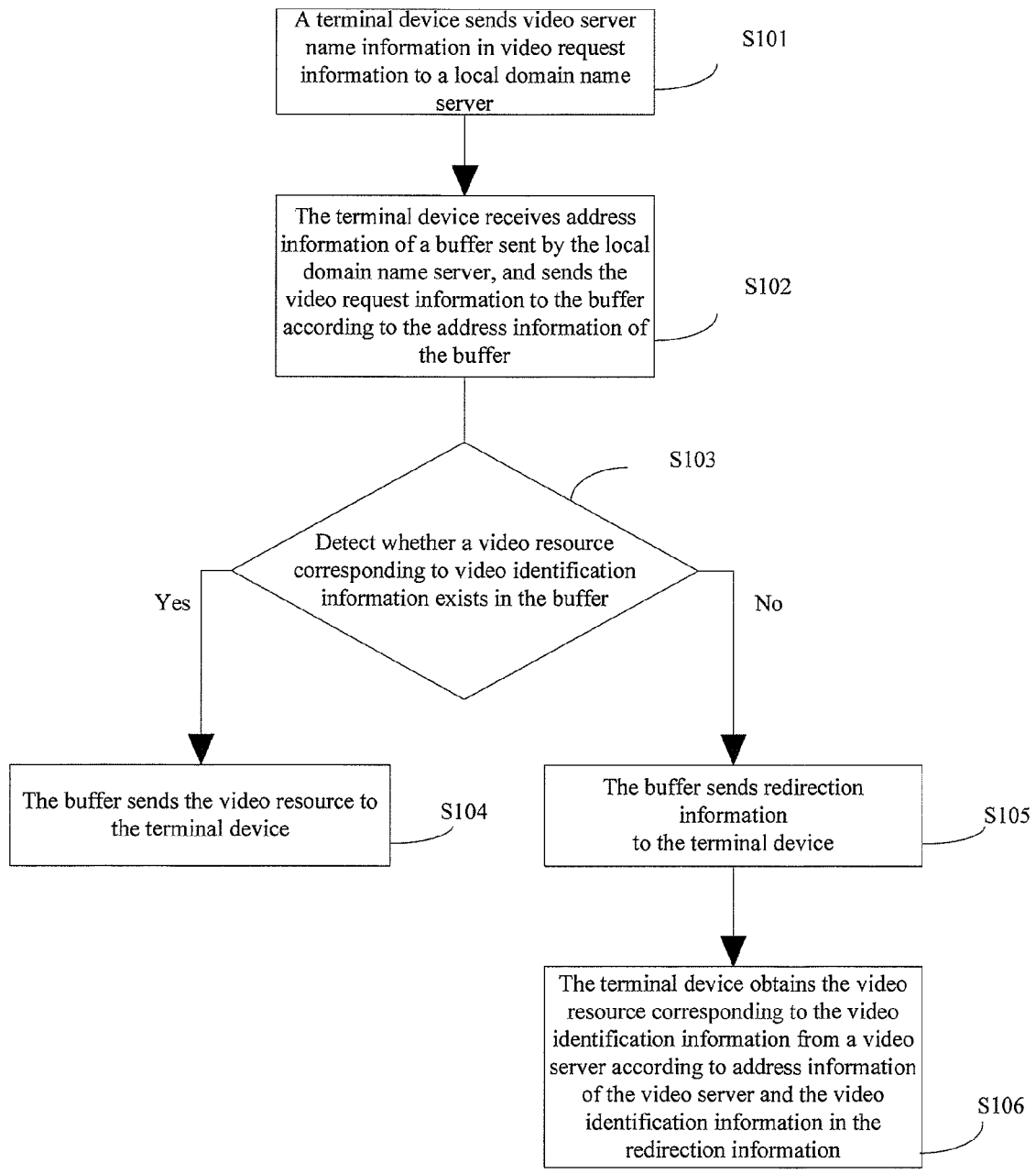
FIG. 1 is a flowchart of a method for transmitting a network video according to Embodiment 1 of the present invention.

This embodiment of the present invention provides a method for transmitting a network video. As shown in FIG. 1, the method includes:

S101. A terminal device sends video server name information in video request information to a local domain name server.

The terminal device sends the video server name information in the video request information to the local domain name server, so that the local domain name server parses the video server name information to obtain address information of a buffer. In a practical application, the video request information may be specifically represented by a URL (Uniform Resource Locator, uniform resource locator) access command, for example:

The terminal device may use the URL access command as the video request information. For example, a character string of the URL access command is: http://video.xyz.com/a.flv, where video.xyz.com is a host name of a video server, and a.flv is a specific video to be accessed; the terminal device sends video.xyz.com as the video server name information to the local domain name server, and uses a.flv as video identification information.

S102. The terminal device receives the address information of the buffer sent by the local domain name server, and sends the video request information to the buffer according to the address information of the buffer.

The terminal device receives the address information of the buffer sent by the local domain name server, and sends the video request information to the buffer according to the address information of the buffer, so that the buffer can detect existence of a video resource corresponding to the video identification information in the video request information.

S103. Detect whether the video resource corresponding to the video identification information in the video request information exists in the buffer.

After receiving the video request information sent by the terminal device, the buffer detects whether the video resource corresponding to the video identification information exists in the buffer. If the video resource corresponding to the video identification information exists in the buffer, the procedure proceeds to S104; if the video resource corresponding to the video identification information does not exist in the buffer, the procedure proceeds to S105.

S104. The buffer sends the video resource to the terminal device.

In an embodiment, if, by means of a query, the buffer learns that the video resource corresponding to the video identification information exists in video resources buffered in the buffer, the buffer directly sends the video resource to the terminal device. After the terminal device obtains the video resource corresponding to the video identification information, the procedure is complete.

S105. The buffer sends redirection information to the terminal device.

The redirection information includes address information of a video server corresponding to the video server name information, and the video identification information.

Optionally, the address information of the video server that has the video resource is obtained by the buffer by using a secondary domain name server, where the secondary domain name server is used to obtain the address information of the video server according to the video server name information.

S106. The terminal device obtains the video resource corresponding to the video identification information from the video server according to the address information of the video server and the video identification information in the redirection information.

In an embodiment, the local domain name server is used to parse the video server name information into the address information of the buffer. A parsing manner may be: The video server name information and address information corresponding to the video server name information exist in a database list of the local domain name server, where the address information is an Internet Protocol IP (Internet Protocol) address of the buffer (that is, the address information of the buffer). When the local domain name server parses the video server name information, the IP address of the buffer corresponding to the video server name information is finally obtained.

The secondary domain name server is used to parse the video server name information into the address information of the video server. A parsing manner may be: The video server name information and address information corresponding to the video server name information exist in a database list of the secondary domain name server, where the address information is an IP address of the video server (that is, the address information of the video server). When the secondary domain name server parses the video server name information, the IP address of the video server corresponding to the video server name information is finally obtained.

In the method for transmitting a network video according to this embodiment of the present invention, a local domain name server instead of a network router is used to parse video request information sent by a user. If a video resource required by the video request information sent by the user does not exist in a buffer, a secondary domain name server parses the video request information again, and the buffer sends data to a terminal device of the user, so that the terminal device can be directly connected to a video server. In this embodiment of the present invention, the local domain name server instead of the network router is used to parse the video request information sent by the user, thereby reducing a running load of the network router; when the required video resource does not exist in the buffer, the terminal device can be directly connected to the video server to obtain the video resource, thereby shortening waiting time for the user, preventing a black screen that may occur due to long waiting time, and improving user experience. If the local domain name server parses only specified information segments in the video request information, costs consumed in the parsing process can be reduced.

Embodiment 2

Figure 2:
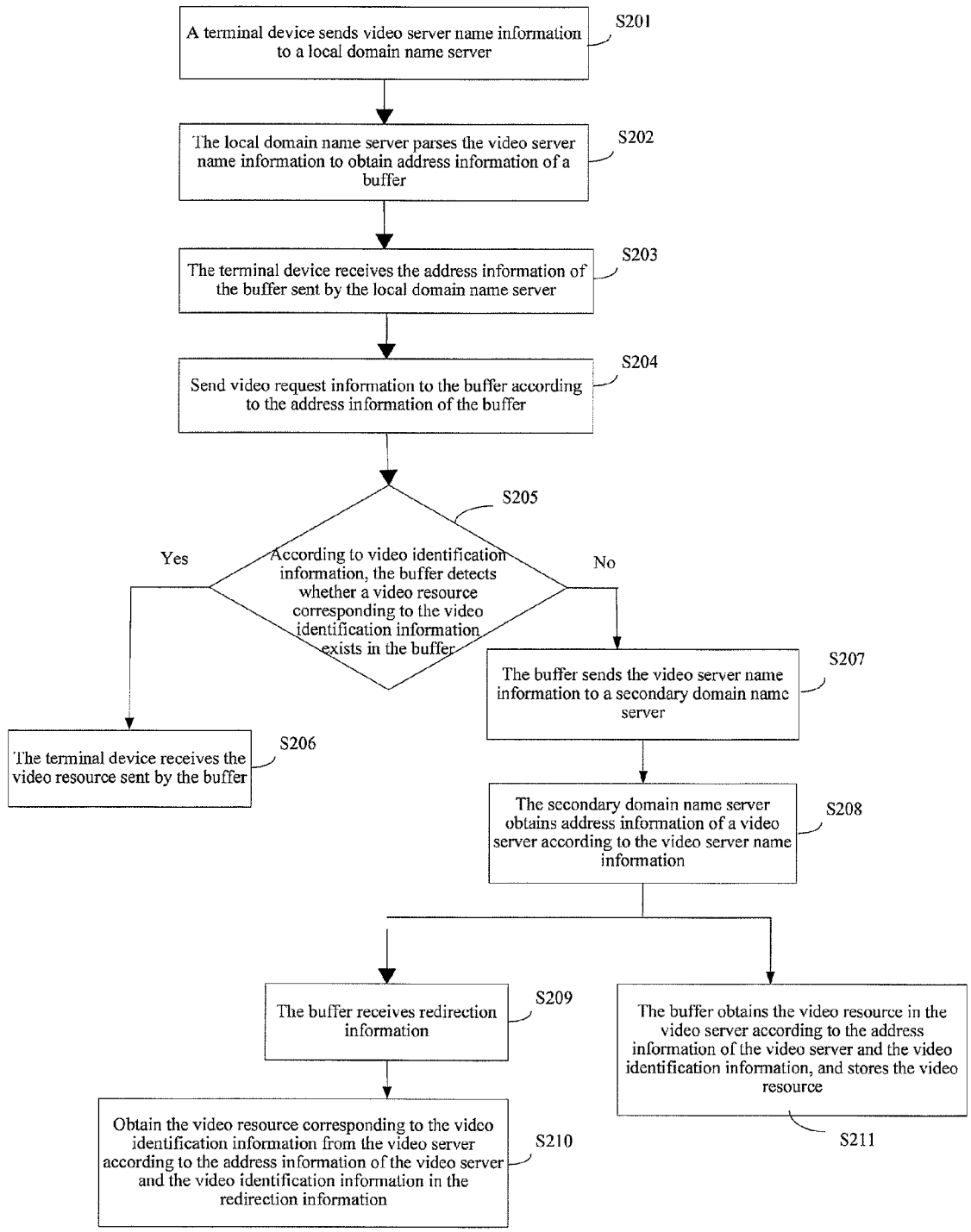
FIG. 2 is a flowchart of a method for transmitting a network video according to Embodiment 2 of the present invention.
Figure 3:
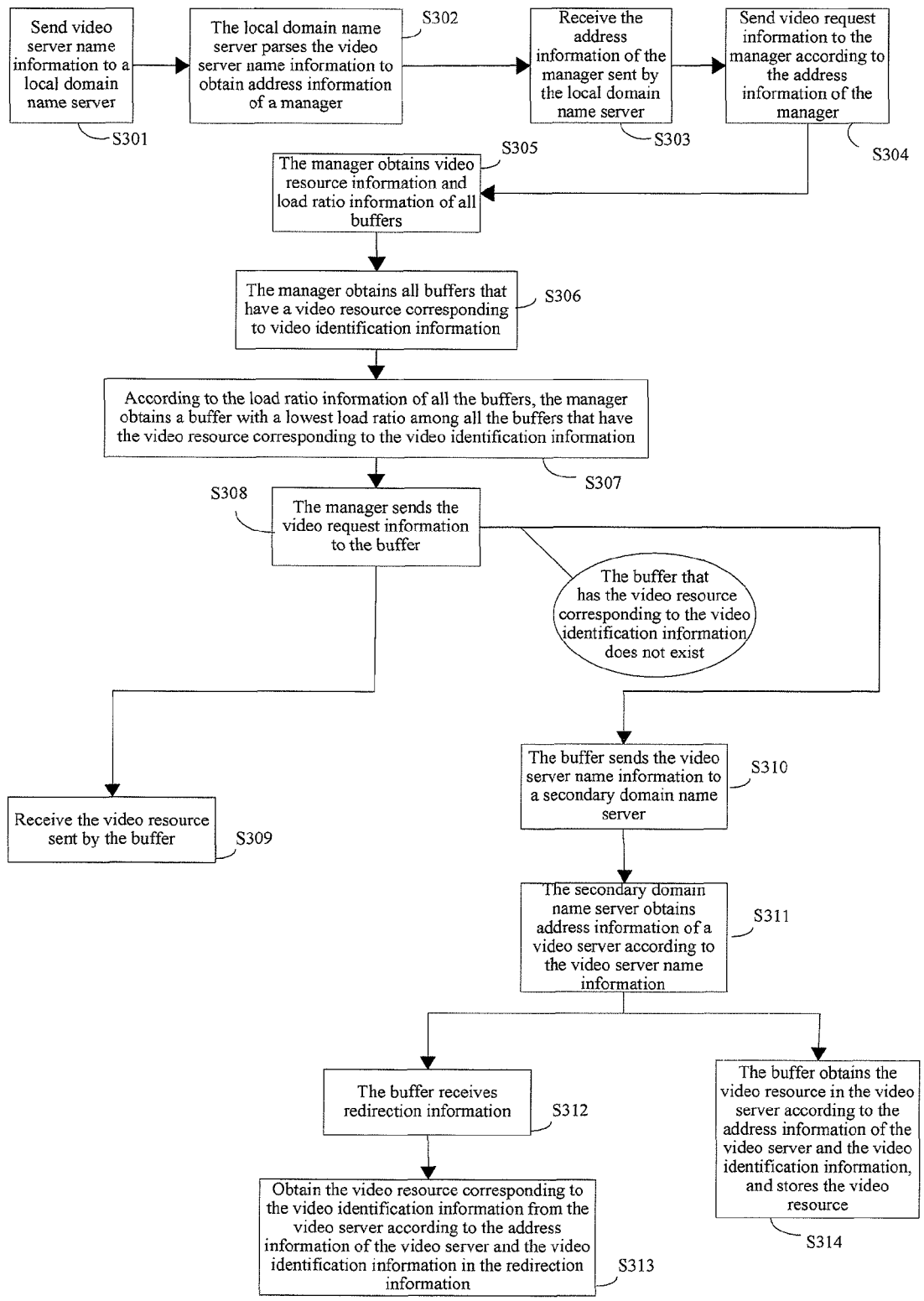
FIG. 3 is a flowchart of a method for transmitting a network video according to Embodiment 3 of the present invention.

This embodiment of the present invention provides a method for transmitting a network video. As shown in FIG. 2, the method includes:

S201. A terminal device sends video server name information in video request information to a local domain name server.

The terminal device sends the video server name information to the local domain name server, so that the local domain name server parses the video server name information to obtain address information of a buffer.

In an embodiment, the terminal device sends the video server name information to the local domain name server. The video server name information may be a host name of a video server in which a video to be accessed by a user is located, for example:

A URL access command entered by the user in the terminal device is: http://video.xyz.com/a.flv, where video.xyz.com is the host name of the video server, and a.flv is the specific video to be accessed. The terminal device does not know an IP address corresponding to video.xyz.com (that is, address information of the video server), and thus needs to request the local domain name server to obtain the IP address corresponding to video.xyz.com by means of parsing.

S202. The local domain name server parses the video server name information to obtain the address information of the buffer corresponding to the video server name information.

In an embodiment, the local domain name server parses the video server name information to obtain the address information of the buffer corresponding to the video server name information, and uses the address information of the buffer, which is obtained by means of parsing, corresponding to the video server name information, as a destination address that is required for the terminal device to send the video request information, for example video.xyz.com is the host name of the video server, and is parsed by the local domain name server as the video server name information. In a database list of the local domain name server, the address information corresponding to the video server name information is an IP address of the buffer (that is, the address information of the buffer) corresponding to the video server name information. Therefore, when the local domain name server parses the video server name information, the IP address of the buffer corresponding to the video server name information, such as 210.1.1.1, is obtained.

Optionally, data processed by the local domain name server may include only the video server name information (such as video.xyz.com), and other unrelated data does not need to be processed, thereby reducing costs consumed in the parsing process.

S203. The terminal device receives the address information of the buffer sent by the local domain name server.

The terminal device receives the address information of the buffer sent by the local domain name server, so that in S205 the buffer can detect, according to video identification information in the video request information, whether a video resource corresponding to the video identification information exists in the buffer.

S204. Send the video request information to the buffer according to the address information of the buffer.

In an embodiment, after receiving the address information of the buffer sent by the local domain name server, the terminal device sends the video request information to the buffer corresponding to the server name information according to the address information of the buffer. For example, the video request information sent by the terminal device to the buffer corresponding to the server name information may be an IP packet that is a GET packet (a request packet that uses GET as a request method) at the application layer, and a URL of the packet is http://video.xyz.com/a.flv, which remains unchanged, but a destination address of the IP packet is 210.1.1.1, which is the IP address of the buffer (that is, the address information of the buffer).

S205. According to the video identification information, the buffer detects whether the video resource corresponding to the video identification information exists in the buffer.

After the video request information arrives at the buffer, the buffer detects whether the video resource corresponding to the video identification information in the video request information exists in the buffer itself, for example:

The buffer analyzes the IP packet that serves as the video request information, such as http://video.xyz.com/a.flv, and finds the video identification information (that is, a character a.flv) in the URL of the IP packet, thereby learning that the video resource corresponding to a.flv is requested by the user. Subsequently, the buffer queries all buffered video resources to check whether the video resource corresponding to a.flv exists.

S206. If the video resource corresponding to the video identification information exists in the buffer, the terminal device receives the video resource sent by the buffer.

In an embodiment, if, by means of a query, the buffer learns that the video resource required by the terminal device exists in video resources buffered in the buffer, the buffer directly sends the video resource to the terminal device. After the terminal device obtains the requested video resource, the procedure is complete.

The procedure from S201 to S206 in this embodiment of the present invention can increase a speed at which the terminal device obtains the video resource. In addition, in the entire procedure, the local domain name server instead of a network router is used to process data. The network router only needs to send local video request information to the local domain name server without performing any extra work, thereby reducing workload of the network router. In addition, because the terminal device does not need to obtain the video resource from the video server directly, bandwidth of a metropolitan area network and a backbone network is saved.

Optionally, in S207, if the video resource corresponding to the video identification information does not exist in the buffer, the buffer sends the video server name information to a secondary domain name server.

In an embodiment, if, by means of a query, the buffer learns that the video resource required by the terminal device does not exist in the buffered video resources, the buffer sends the video server name information in the video request information to the secondary domain name server.

S208. The secondary domain name server obtains the address information of the video server according to the video server name information.

In this embodiment, according to the video server name information sent by the buffer, the secondary domain name server may obtain the address information of the video server in which the video resource required by the terminal device is located. In a database list of the secondary domain name server, the address information corresponding to the video server name information is the address information of the video server in which the required video resource is located. Therefore, when the secondary domain name server parses the video server name information, the address information of the video server is obtained.

S209. The buffer receives redirection information.

The redirection information includes the address information of the video server that has the video resource, and the video identification information.

In an embodiment, if the video resource requested by the user is not buffered in the buffer, in order to prevent the user from waiting for a long time, the video request sent by the terminal device needs to be redirected to the video server, so as to obtain the video resource from the video server directly, for example:

The video request that is sent by the terminal device and is redirected to the video server is http://121.9.204.146/a.flv, where 121.9.204.146 is an IP address of the video server (the address information of the video server) obtained by the buffer after the secondary domain name server performs parsing. After the buffer sends the video request that is redirected to the video server to the terminal device, the terminal device can request the required video resource from the video server according to 121.9.204.146 (the address information of the video server) and a.flv (the video identification information).

Meanwhile, S211 is performed on the buffer.

S210. Obtain the video resource corresponding to the video identification information from the video server according to the address information of the video server and the video identification information in the redirection information.

In an embodiment, after receiving the redirection information sent by the buffer, the terminal device requests the video resource from the video server according to the address information of the video server and the video identification information in the redirection message. After receiving the video request sent by the terminal device, the video server responds to the video request of the terminal device and sends the corresponding video resource. In this embodiment of the present invention, when the terminal device is unable to obtain the requested video resource from the buffer directly, the terminal device requests the video resource immediately from the video server. In this process, the terminal device does not need to wait for a long time for the buffer to obtain the video resource first and then download the video resource from the buffer. Therefore, the terminal device of the user does not encounter a black screen that may occur due to long waiting time, which improves user experience.

Optionally, in S211, the buffer obtains the video resource in the video server according to the address information of the video server and the video identification information and stores the video resource.

Optionally, in an embodiment, the buffer requests the video resource from the video server according to the address information of the video server and the video identification information. After receiving the video request sent by the buffer, the video server responds to the buffer and sends the video resource requested by the buffer. After receiving the requested video resource, the buffer buffers the video resource. When a user requests the same video resource subsequently, the buffer may directly send the video resource to the user who requests the video resource.

In an embodiment, the local domain name server is used to parse the video server name information into the address information of the buffer. A parsing manner may be: The video server name information and address information corresponding to the video server name information exist in a database list of the local domain name server, where the address information is an IP address of the buffer (that is, the address information of the buffer). Therefore, when the local domain name server parses the video server name information, the IP address of the buffer corresponding to the video server name information is finally obtained.

The secondary domain name server is used to parse the video server name information into the address information of the video server. A parsing manner: The video server name information and address information corresponding to the video server name information exist in a database list of the secondary domain name server, where the address information is an IP address of the video server (that is, the address information of the video server). Therefore, when the secondary domain name server parses the video server name information, the IP address of the video server corresponding to the video server name information is finally obtained.

In the method for transmitting a network video according to this embodiment of the present invention, a local domain name server instead of a network router is used to parse video request information sent by a user. If a video resource required by the video request information sent by the user does not exist in a buffer, a secondary domain name server parses the video request information again, and the buffer sends data to a terminal device of the user, so that the terminal device of the user can be directly connected to a video server. In this embodiment of the present invention, the local domain name server instead of the network router is used to parse the video request information sent by the user, thereby reducing a running load of the network router; when the required video resource does not exist in the buffer, the terminal device of the user can be directly connected to the video server to obtain the video resource, thereby shortening waiting time for the user, preventing a black screen that may occur due to long waiting time, and improving user experience. If only specified information segments in the video request information are parsed, costs consumed in the parsing process can be reduced.

Embodiment 3

This embodiment of the present invention provides a method for transmitting a network video.

A manager that participates in implementation of the solution in the invention is added to this embodiment on the basis of Embodiment 2. In a practical application of the present invention, there may be multiple buffers corresponding to the video identification information. These buffers are managed by one or more managers. The managers provide a most suitable buffer for a terminal according to a condition (a load condition, a principle of proximity, or the like), so that the buffers can be deployed for terminal devices of users more flexibly. In addition, by means of centralized scheduling performed by the managers, a load balance can be maintained between the buffers.

Specifically, in this embodiment, the manager is used to: receive the video request information sent by the terminal device, and then obtain video resource information and load ratio information of all buffers; according to the video identification information in the video request information sent by the terminal device and the video resource information of all the buffers, obtain all buffers that have the video resource corresponding to the video identification information; obtain a buffer with a lowest load ratio according to the load ratio information of all the buffers, or obtain a buffer with a lowest load ratio among all the buffers that have the video resource corresponding to the video identification information according to the load ratio information of all the buffers; and send the video request information to the buffer with the lowest load ratio, or to the buffer with the lowest load ratio among all the buffers that have the video resource corresponding to the video identification information.

The method in this embodiment includes:

S301. A terminal device sends video server name information in video request information to a local domain name server.

The terminal device sends the video server name information to the local domain name server, so that the local domain name server parses the video server name information to obtain address information of a manager.

In an embodiment, the terminal device sends the video server name information to the local domain name server, where the video server name information may be a host name of a video server in which a video to be accessed by a user is located.

S302. The local domain name server parses the video server name information to obtain the address information of the manager.

In an embodiment, the local domain name server parses the video server name information to obtain the address information of the manager, and uses the address information of the manager as a destination address, for example:

video.xyz.com is the host name of the video server, and the local domain name server parses the host name of the video server as the video server name information. In a database list of the local domain name server, address information corresponding to the video server name information is an IP address of the manager (that is, the address information of the manager). Therefore, when the local domain name server parses the video server name information, the IP address of the manager, such as 210.1.1.100, is obtained.

Optionally, data processed by the local domain name server may include only the video server name information (such as video.xyz.com), and other unrelated data does not need to be processed, thereby reducing costs consumed in the parsing process.

S303. Receive the address information of the manager sent by the local domain name server.

In an embodiment, the terminal device receives the address information of the manager sent by the local domain name server.

S304. Send the video request information to the manager according to the address information of the manager.

In an embodiment, after receiving the address information of the manager sent by the local domain name server, the terminal device sends the video request information to the manager according to the address information of the manager, for example:

The video request information sent by the terminal device to the manager may be an IP packet that is a GET packet (a request packet that uses GET as a request method) at the application layer, and a URL of the packet is http://video.xyz.com/a.flv, which remains unchanged, but a destination address of the IP packet is 210.1.1.100, which is the IP address of the manager (the address information of the manager).

S305. The manager obtains video resource information and load ratio information of all buffers.

In an embodiment, one manager may be allocated in each cell or network area. The manager is used to manage and schedule all buffers and related devices covered in the cell or network area in a centralized manner.

The manager may deploy a buffer for the terminal device with reference to conditions such as a condition of resources currently buffered in the buffer and a load condition of the buffer. The condition of the resources currently buffered in the buffer is a most preferred condition. That is, the buffer that has a video resource required by the user is preferentially deployed for the terminal device, so that the terminal device can quickly obtain the required video resource, which shortens waiting time required for obtaining the video resource. Further, when multiple buffers have the video resource required by the user, a buffer with a lightest load that has the video resource required by the user is deployed for the user according to load conditions of all the buffers that have the video resource required by the user, so as to ensure that the deployed buffer can send the required video resource to the terminal device at a high transmission bit rate of video data in a short response time when the terminal device quickly obtains the required video resource, which further shortens waiting time required for the terminal device to obtain the video resource. Still further, when none of the buffers managed by the manager has buffered the video resource required by the user, the manager may select a buffer with a lightest load, so that the buffer can respond to the terminal device quickly and send redirection information.

In a practical application of the present invention, the manager may deploy buffers in multiple manners. For example, after selecting a buffer readily available for deployment, the manager sends corresponding instruction information to the buffer. According to the instruction information sent by the manager, the buffer learns the terminal device that requires a video service, and sends the buffered video resource required by the user to the terminal device. An implementation manner of deploying the buffer by the manager is not limited in the embodiments of the present invention, and may be any implementation manner that is well known to a person skilled in the art.

Figure 4:
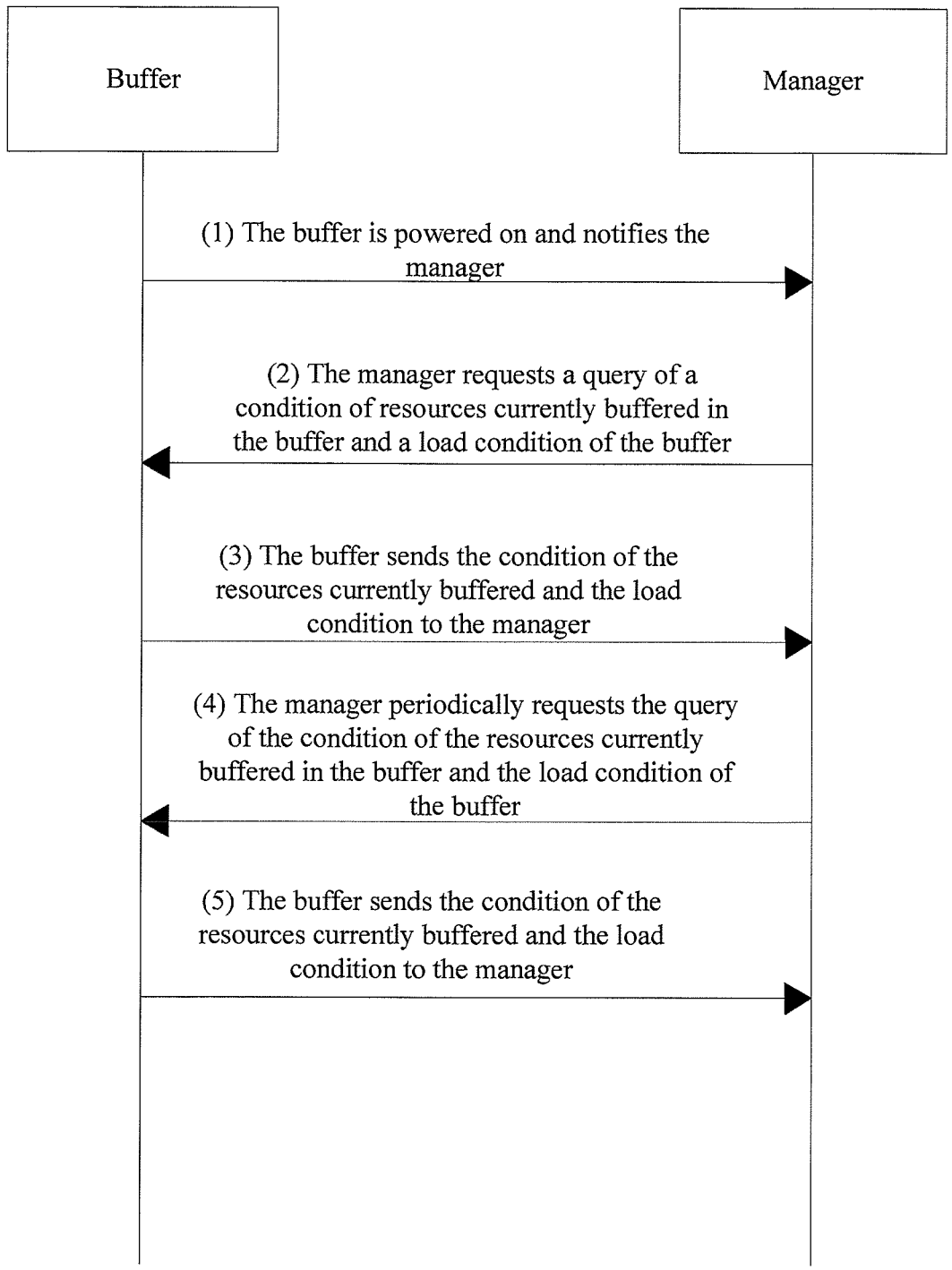
FIG. 4 is a flowchart of a specific example of the method for transmitting a network video according to Embodiment 3 of the present invention.

Specifically, as shown in FIG. 4, a method for managing and scheduling the buffer by using the manager may be:

(1) The buffer is powered on, sends a notification message, indicating that the buffer has joined a network and can execute a scheduling command of the manager, to the manager, and provides services for the terminal device of the user.

(2) The manager records an address of the buffer, and sends a query message to the buffer, so as to request a query of the condition of the video resources currently buffered in the buffer and the load condition of the buffer.

(3) The buffer reports the condition of the video resources currently buffered and the load condition to the manager, and the manager marks the buffer in an "Active" state.

(4) The manager periodically sends query messages subsequently. For example, the query messages are sent every 2 seconds to query the condition of the video resources currently buffered in the buffer and the load condition of the buffer.

(5) After receiving a query request message of the manager, the buffer reports the condition of the video resources currently buffered and the load condition to the manager.

Optionally, the managing and scheduling the buffer by using the manager may further include:

When the manager receives no response message from a buffer after sending the query request message, the manager believes that the buffer may be faulty, and marks the state of the buffer as a "Ready" state. If still no response is received from the buffer after multiple queries, the manager marks the state of the buffer as an "Inactive" state, and does not mark the state of the buffer as an "Active" state until the manager receives a response message from the buffer again.

After the buffer is powered on normally, if no query message is received from the manager, the buffer may proactively send a report message to the manager periodically, so as to report the condition of the resources currently buffered in the buffer and the load condition of the buffer.

S306. The manager obtains address information of all buffers that have a video resource corresponding to video identification information.

According to the video identification information in the video request information and the video resource information of all the buffers, the manager obtains address information of all the buffers that have the video resource corresponding to the video identification information.

In an embodiment, according to the video identification information in the video request information and the video resource information of all the buffers managed by the manager, the manager may find the buffers that have the video resource corresponding to the video identification information.

Optionally, an order of performing S305 and S306 may be not limited. That is, S306 may be performed before S305, or S305 and S306 may be performed simultaneously.

S307. According to the load ratio information of all the buffers, the manager obtains a buffer with a lowest load ratio among all the buffers that have the video resource corresponding to the video identification information.

If none of the buffers managed by the manager has the video resource corresponding to the video identification information, the manager directly obtains a buffer with a lowest load ratio among all the managed buffers, and then S310 to S314 are performed.

S308. The manager sends the video request information to the buffer.

In an embodiment, the manager sends the video request information to the obtained buffer with the lowest load ratio, and the buffer mentioned in subsequent S309 to S314 refers to the buffer with the lowest load ratio. Here, the manager may encapsulate a layer of a new IP header to an outer layer of an IP packet that carries the video request information. A source address of the new IP header is the address of the manager, and a destination address is the address of the selected buffer.

S309. If the video resource corresponding to the video identification information exists in the buffer, receive the video resource sent by the buffer.

In an embodiment, the video resource requested by the user has been buffered in the buffer, and the buffer sends the video resource to the user. In this embodiment, the manager directly receives the video request information sent by the terminal device. Therefore, when sending the video resource to the terminal device, the buffer needs to be disguised as the manager (that is, when the buffer sends the video resource to the terminal device, a source IP address in the IP packet sent together with the video resource needs to be changed to the IP address of the manager, and the destination address is still the IP address of the terminal device, so that the terminal device believes that the received video resource is sent by the manager), or sends the video resource back to the manager and the manager sends the video resource to the terminal device. Specific implementation manners in which the buffer is disguised as the manager and the manager sends the video resource to the terminal device have been well known to a person skilled in the art, and are not repeated herein any further.

After the terminal device obtains the requested video resource, the procedure is complete.

S310. If the video resource corresponding to the video identification information does not exist in the buffer, the buffer sends the video server name information to a secondary domain name server.

In an embodiment, if, by means of a query, the buffer learns that the video resource required by the terminal device does not exist in the buffered video resources, the buffer sends the video server name information in the video request information to the secondary domain name server.

S311. The secondary domain name server obtains address information of the video server according to the video server name information.

In an embodiment, according to the video server name information sent by the buffer, the secondary domain name server may obtain the address information of the video server in which the required video resource is located. In a database list of the secondary domain name server, the address information corresponding to the video server name information is the address information of the video server in which the required video resource is located. Therefore, when the local domain name server parses the video server name information, the address information of the video server is obtained.

S312. The buffer receives redirection information.

The redirection information includes the address information of the video server that has the video resource, and the video identification information.

In an embodiment, if the video resource requested by the user is not buffered in the buffer, in order to prevent the user from waiting for a long time, the terminal device needs to be redirected to the video server, so as to obtain the video resource from the video server directly.

S313. The terminal device obtains the video resource corresponding to the video identification information from the video server according to the address information of the video server and the video identification information in the redirection information.

In an embodiment, after receiving the redirection information sent by the buffer, the terminal device requests the video resource from the video server according to the address information of the video server and the video identification information in the redirection message. After being authorized, the video server responds to the terminal device and sends the video resource. When the user is unable to obtain the video resource from the buffer directly, the user requests the video resource from the video server immediately. Different from the prior art, the terminal device does not need to wait for a long time for the buffer to obtain the video resource first and then download the video resource from the buffer. Therefore, the terminal device of the user does not encounter a black screen that may occur due to long waiting time, which improves user experience.

S314. The buffer obtains the video resource in the video server according to the address information of the video server and the video identification information, and stores the video resource.

In an embodiment, the buffer requests the video resource from the video server according to the address information of the video server and the video identification information. After receiving the video request sent by the buffer, the video server responds to the buffer and sends the video resource. After receiving the requested video resource, the buffer buffers the video resource. When a user requests the same video resource subsequently, the buffer may directly send the video resource to the requesting user.

In an embodiment, the local domain name server is used to parse the video server name information into the address information of the manager. A parsing manner may be: The video server name information and address information corresponding to the video server name information exist in a database list of the local domain name server, where the address information is the IP address of the manager (that is, the address information of the manager). Therefore, when the local domain name server parses the video server name information, the IP address of the manager is finally obtained.

The secondary domain name server is used to parse the video server name information into the address information of the video server. A parsing manner may be: The video server name information and address information corresponding to the video server name information exist in a database list of the secondary domain name server, where the address information is an IP address of the video server (that is, the address information of the video server). Therefore, when the secondary domain name server parses the video server name information, the IP address of the video server is finally obtained.

In the method for transmitting a network video according to this embodiment of the present invention, a local domain name server instead of a network router is used to parse video request information sent by a user. When a video resource required by the video request information sent by the user does not exist in a buffer, a secondary domain name server parses the video request information again, and the buffer sends data to a terminal device of the user, so that the terminal device of the user can be directly connected to a video server. Optionally, if multiple buffers exist, a manager selects a proper buffer for the user according to running conditions of the buffers. Compared with the prior art, in this embodiment of the present invention, the local domain name server instead of the network router is used to parse the video request information sent by the user, thereby reducing a running load of the network router; if only specified information segments in the video request information are parsed, costs consumed in the parsing process can be reduced; when the required video resource does not exist in the buffer, the terminal device of the user can be directly connected to the video server to obtain the video resource, thereby shortening waiting time for the user, preventing a black screen that may occur due to long waiting time, and improving user experience; the buffers are scheduled properly by using the manager, thereby improving a load capability of a system.

Embodiment 4

Figure 5:
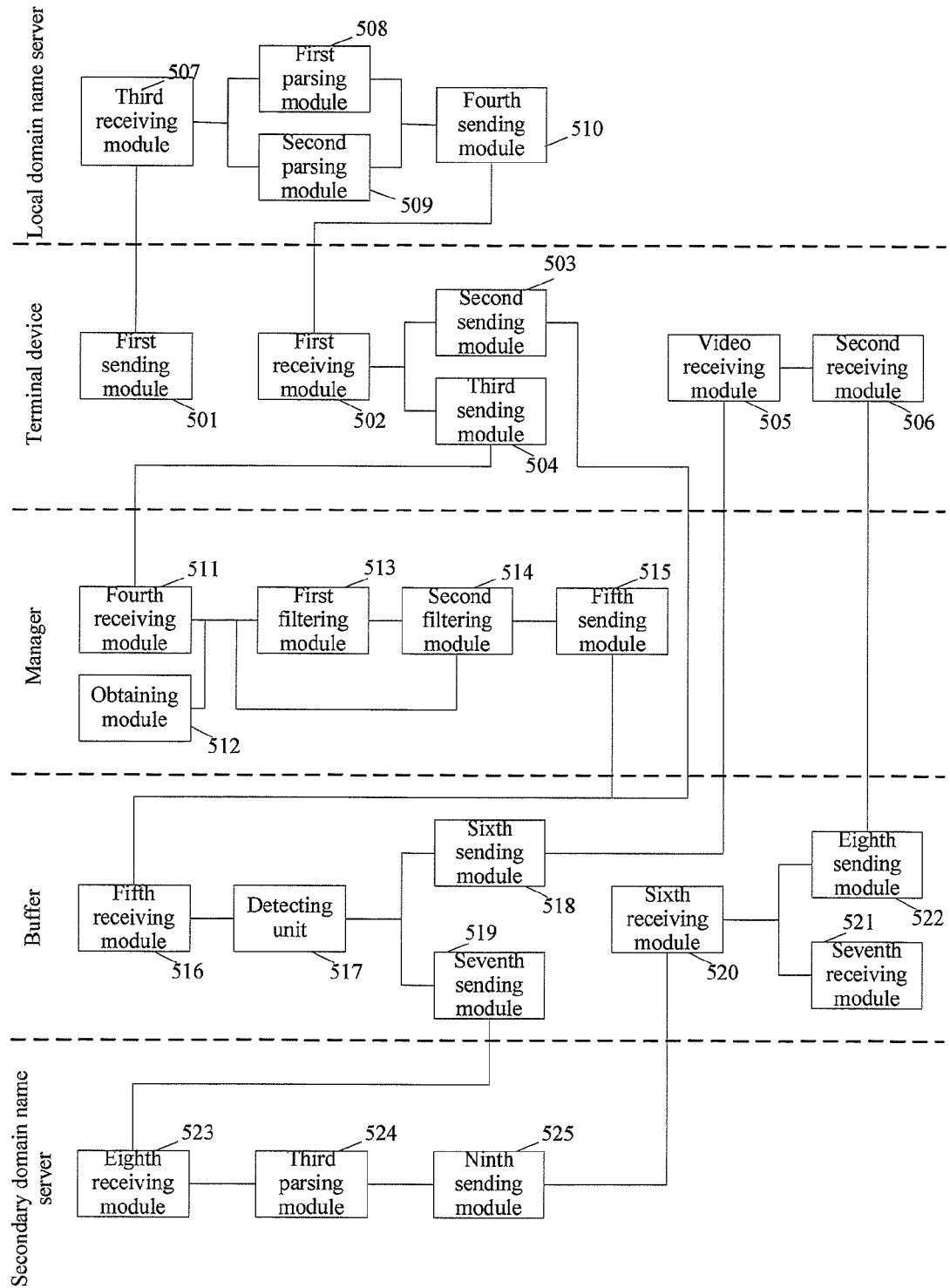
FIG. 5 is a schematic structural diagram of apparatuses for transmitting a network video according to Embodiment 4 of the present invention.

This embodiment of the present invention provides apparatuses for transmitting a network video. As shown in FIG. 5, the apparatuses include:

a terminal device, a local domain name server, a buffer, and a secondary domain name server.

The terminal device includes a first sending module 501, a first receiving module 502, a second sending module 503, a third sending module 504, a video receiving module 505, and a second receiving module 506.

The first sending module 501 is configured to send video server name information in video request information to the local domain name server.

The first receiving module 502 is configured to receive address information of the buffer sent by the local domain name server, or receive address information of a manager sent by the local domain name server.

The second sending module 503 is configured to send the video request information to the buffer according to the address information of the buffer.

The third sending module 504 is configured to send the video request information to the manager according to the address information of the manager.

The video receiving module 505 is configured to: if a video resource corresponding to video identification information in the video request information exists in the buffer, receive the video resource corresponding to the video identification information from the buffer; or, if a video resource corresponding to video identification information in the video request information does not exist in the buffer, obtain the video resource corresponding to the video identification information from a video server according to address information of the video server and the video identification information in redirection information.

The second receiving module 506 is configured to receive the redirection information sent by the buffer.

The local domain name server includes a third receiving module 507, a first parsing module 508, a fourth sending module 509, and a second parsing module 510.

The third receiving module 507 is configured to receive the video server name information sent by the terminal device.

The first parsing module 508 is configured to parse the video server name information to obtain the address information of the buffer.

The second parsing module 509 is configured to parse the video server name information to obtain the address information of the manager.

The fourth sending module 510 is configured to send the address information of the buffer or the address information of the manager to the terminal device.

The buffer includes a fifth receiving module 516, a detecting unit 517, a sixth sending module 518, a seventh sending module 519, a sixth receiving module 520, a seventh receiving module 521, and an eighth sending module 522.

The fifth receiving module 516 is configured to receive the video request information sent by the terminal device or the video request information sent by the manager.

The detecting unit 517 is configured to: according to the video identification information in the video request information, detect whether the video resource corresponding to the video identification information exists in the buffer.

The sixth sending module 518 is configured to: if the video resource corresponding to the video identification information exists in the buffer, send the video resource to the terminal device.

The seventh sending module 519 is configured to: if the video resource corresponding to the video identification information does not exist in the buffer, send the video server name information in the video request information to the secondary domain name server.

The sixth receiving module 520 is configured to receive address information of the video server sent by the secondary domain name server.

The seventh receiving module 521 is configured to obtain the video resource corresponding to the video identification information in the video server according to the address information of the video server and the video identification information.

The eighth sending module 522 is configured to send the redirection information to the terminal device, where the redirection information includes the address information of the video server and the video identification information.

The secondary domain name server includes an eighth receiving module 523, a third parsing module 524, and a ninth sending module 525.

The eighth receiving module 523 is configured to receive the video server name information sent by the buffer.

The third parsing module 524 is configured to obtain the address information of the video server according to the video server name information.

The ninth sending module 525 is configured to send the address information of the video server to the buffer.

For the apparatuses for transmitting a network video according to this embodiment of the present invention, a local domain name server instead of a network router is used to parse video request information sent by a user. If a video resource required by the video request information sent by the user does not exist in a buffer, a secondary domain name server parses the video request information again, and the buffer sends data to a terminal device of the user, so that the terminal device of the user can be directly connected to a video server. Compared with the prior art, in this embodiment of the present invention, the local domain name server instead of the network router is used to parse the video request information sent by the user, thereby reducing a running load of the network router; if only specified information segments in the video request information are parsed, costs consumed in the parsing process are reduced; when the required video resource does not exist in the buffer, the terminal device of the user can be directly connected to the video server to obtain the video resource, thereby shortening waiting time for the user, preventing a black screen that may occur due to long waiting time, and improving user experience.

Further, optionally, as shown in FIG. 5, the apparatuses further include a manager. The manager includes a fourth receiving module 511, an obtaining module 512, a first filtering module 513, a second filtering module 514, and a fifth sending module 515.

The fourth receiving module 511 is configured to receive the video request information sent by the terminal device.

The obtaining module 512 is configured to obtain video resource information and load ratio information stored in multiple buffers.

The first filtering module 513 is configured to: according to the video identification information in the video request information sent by the terminal device and the video resource information stored in all the buffers, obtain multiple buffers that have the video resource corresponding to the video identification information.

The second filtering module 514 is configured to obtain a buffer with a lowest load ratio according to the load ratio information of all the buffers, or obtain a buffer with a lowest load ratio among all the buffers that have the video resource corresponding to the video identification information according to the load ratio information of all the buffers.

The fifth sending module 515 is configured to send the video request information to the buffer with the lowest load ratio, or to the buffer with the lowest load ratio among all the buffers that have the video resource corresponding to the video identification information.

The manager in this embodiment of the present invention can select a proper buffer for the user according to running conditions of the buffers. Compared with the prior art, this embodiment of the present invention can schedule the buffers properly by using the manager, which improves a load capability of a system.

Embodiment 5

Figure 6:
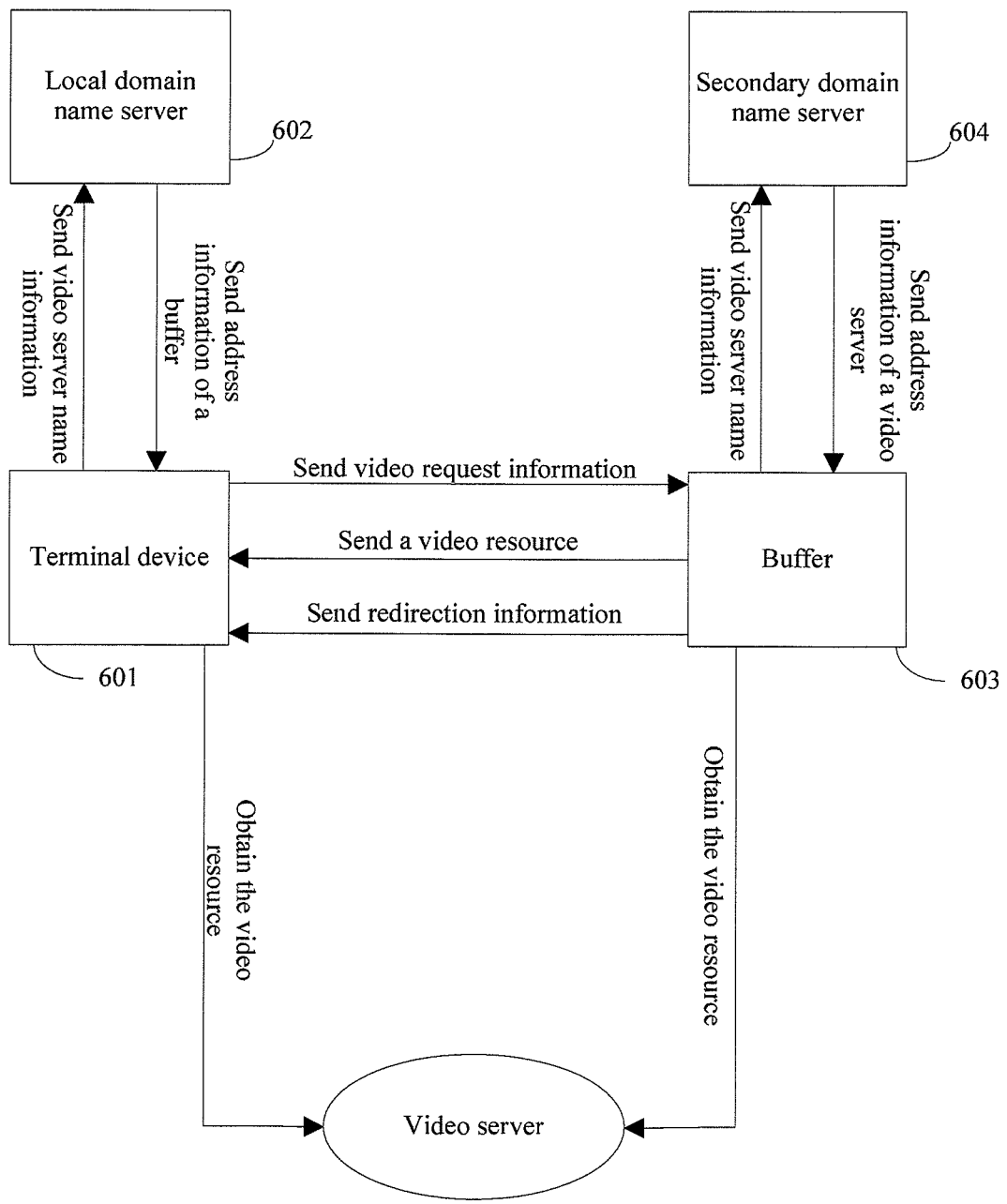
FIG. 6 is a structural diagram of a system for transmitting a network video according to Embodiment 5 of the present invention.

This embodiment of the present invention provides a system for transmitting a network video. As shown in FIG. 6, the system includes a terminal device 601, a local domain name server 602, a buffer 603, a secondary domain name server 604, and a manager 605.

The terminal device 601 is configured to: send video server name information in video request information to the local domain name server, receive address information of the buffer sent by the local domain name server, and then send the video request information to the buffer according to the address information of the buffer; if a video resource corresponding to video identification information exists in the buffer, receive the video resource corresponding to the video identification information from the buffer, or if a video resource corresponding to video identification information does not exist in the buffer, receive redirection information sent by the buffer, and obtain the video resource corresponding to the video identification information from a video server according to address information of the video server and the video identification information in the redirection information.

The local domain name server 602 is configured to: receive the video server name information sent by the terminal device, parse the video server name information to obtain the address information of the buffer, and then send the address information of the buffer to the terminal device.

The buffer 603 is configured to: receive the video request information sent by the terminal device, and, according to the video identification information in the received video request information, detect whether the video resource corresponding to the video identification information exists in the buffer; if the video resource corresponding to the video identification information exists in the buffer, send the video resource to the terminal device, or, if the video resource corresponding to the video identification information does not exist in the buffer, send the video server name information in the video request information to the secondary domain name server, receive the address information of the video server sent by the secondary domain name server, obtain the video resource corresponding to the video identification information from the video server according to the address information of the video server and the video identification information in the video request information, and send the redirection information to the terminal device.

The secondary domain name server 604 is configured to receive the video server name information sent by the buffer, obtain the address information of the video server according to the video server name information, and send the address information of the video server to the buffer.

In the system for transmitting a network video according to this embodiment of the present invention, a local domain name server instead of a network router can be used to parse video request information sent by a user. If a video resource required by the video request information sent by the user does not exist in a buffer, a secondary domain name server parses the video request information again, and the buffer sends data to a terminal device of the user, so that the terminal device of the user can be directly connected to a video server. Compared with the prior art, in this embodiment of the present invention, the local domain name server instead of the network router is used to parse the video request information sent by the user, thereby reducing a running load of the network router; if only specified information segments in the video request information are parsed, costs consumed in the parsing process can be reduced; when the required video resource does not exist in the buffer, the terminal device of the user can be directly connected to the video server to obtain the video resource, thereby shortening waiting time for the user, preventing a black screen that may occur due to long waiting time, and improving user experience.

Embodiment 6

Figure 7:
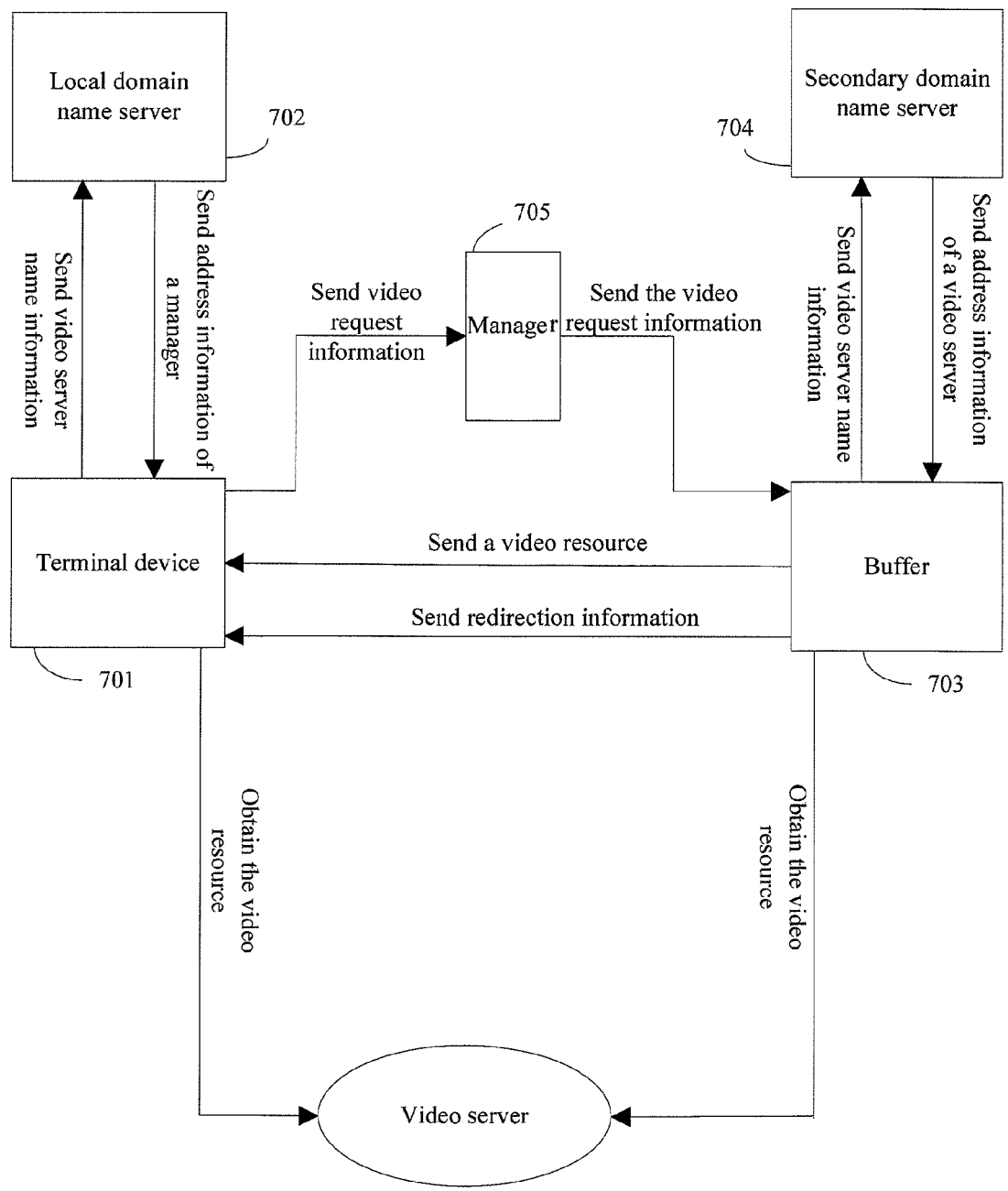
FIG. 7 is a structural diagram of a system for transmitting a network video according to Embodiment 6 of the present invention.

This embodiment of the present invention provides a system for transmitting a network video. As shown in FIG. 7, the system includes a terminal device 701, a local domain name server 702, a buffer 703, a secondary domain name server 704, and a manager 705.

The terminal device 701 is configured to: send video server name information in video request information to the local domain name server, receive address information of a manager sent by the local domain name server, and then send the video request information to the manager according to the address information of the manager; if a video resource corresponding to video identification information exists in the buffer, receive the video resource corresponding to the video identification information from the buffer, or if a video resource corresponding to video identification information does not exist in the buffer, receive redirection information sent by the buffer, and obtain the video resource corresponding to the video identification information from a video server according to address information of the video server and the video identification information in the redirection information.

The local domain name server 702 is configured to: receive the video server name information sent by the terminal device, parse the video server name information to obtain the address information of the manager, and send the address information of the manager to the terminal device.

The buffer 703 is configured to: receive the video request information sent by the manager, and, according to the video identification information in the video request information, detect whether the video resource corresponding to the video identification information exists in the buffer; if the video resource corresponding to the video identification information exists in the buffer, send the video resource to the terminal device, or, if the video resource corresponding to the video identification information does not exist in the buffer, send the video server name information in the video request information to the secondary domain name server, receive the address information of the video server sent by the secondary domain name server, obtain the video resource corresponding to the video identification information from the video server according to the address information of the video server and the video identification information in the video request information, and send the redirection information to the terminal device.

The secondary domain name server 704 is configured to receive the video server name information sent by the buffer, obtain the address information of the video server according to the video server name information, and send the address information of the video server to the buffer.

The manager 705 is configured to: receive the video request information sent by the terminal device, and then obtain video resource information and load ratio information of all buffers; according to the video identification information in the video request information sent by the terminal device and the video resource information of all the buffers, obtain all buffers that have the video resource corresponding to the video identification information; obtain a buffer with a lowest load ratio according to the load ratio information of all the buffers, or obtain a buffer with a lowest load ratio among all the buffers that have the video resource corresponding to the video identification information according to the load ratio information of all the buffers; and send the video request information to the buffer with the lowest load ratio, or to the buffer with the lowest load ratio among all the buffers that have the video resource corresponding to the video identification information.

In the system for transmitting a network video according to this embodiment of the present invention, a local domain name server instead of a network router can be used to parse video request information sent by a user. If a video resource required by the video request information sent by the user does not exist in a buffer, a secondary domain name server parses the video request information again, and the buffer sends data to a terminal device of the user, so that the terminal device of the user can be directly connected to a video server. In addition, a proper buffer may be selected for the user by using a manager according to running conditions of each buffer. Compared with the prior art, in this embodiment of the present invention, the local domain name server instead of the network router is used to parse the video request information sent by the user, thereby reducing a running load of the network router; if only specified information segments in the video request information are parsed, costs consumed in the parsing process can be reduced; when the required video resource does not exist in the buffer, the terminal device of the user can be directly connected to the video server to obtain the video resource, thereby shortening waiting time for the user, preventing a black screen that may occur due to long waiting time, and improving user experience; the buffers are scheduled properly by using the manager, thereby improving a load capability of a system.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a network video, the method comprising:
  sending, by a terminal device, video server name information in video request information to a local domain name server, so that the local domain name server parses the video server name information to obtain Internet Protocol (IP) address information of a buffer corresponding to the video server name information;
  receiving, by the terminal device, the IP address information of the buffer sent by the local domain name server, and sending the video request information to the buffer according to the IP address information of the buffer; and
  when a video resource corresponding to video identification information in the video request information exists in the buffer, sending, by the buffer, the video resource to the terminal device; and
  when a video resource corresponding to video identification information in the video request information does not exist in the buffer, then:
    sending, by the buffer, the video server name information in video request information to a secondary domain name server, so that the secondary domain name server obtains IP address information of a video server corresponding to the video server name information and returns the IP address information of the video server to the buffer;
    sending, by the buffer, redirection information to the terminal device, the redirection information comprising the IP address information of the video server corresponding to the video server name information; and
    obtaining, by the terminal device, the video resource corresponding to the video identification information from the video server according to the redirection information.

2. The method for transmitting a network video according to claim 1, further comprising:
  obtaining, by the buffer, the video resource corresponding to the video identification information in the video server according to the IP address information of the video server and the video identification information.

3. The method for transmitting a network video according to claim 2, wherein, before sending the video request information to the buffer by using a manager, the method further comprises:
  sending, by the terminal device, the video server name information to the local domain name server, so that the local domain name server parses the video server name information to obtain address information of the manager; and
  receiving, by the terminal device, the address information of the manager and sent by the local domain name server, and sending the video request information to the manager according to the address information of the manager.

4. The method for transmitting a network video according to claim 1, wherein sending the video request information to the buffer according to the IP address information of the buffer comprises:
  sending the video request information to the buffer by using a manager, wherein the manager is used to manage multiple buffers and obtain IP address information of the buffers.

5. The method for transmitting a network video according to claim 4, wherein, before sending the video request information to the buffer by using a manager, the method further comprises:
  sending, by the terminal device, the video server name information to the local domain name server, so that the local domain name server parses the video server name information to obtain IP address information of the manager; and
  receiving, by the terminal device, the IP address information of the manager and sent by the local domain name server, and sending the video request information to the manager according to the IP address information of the manager.

6. The method for transmitting a network video according to claim 4, wherein sending the video request information to the buffer by using a manager comprises:
  sending, by the manager, the video request information to a buffer with a lowest load ratio, wherein the manager is further used to obtain the buffer with the lowest load ratio.

7. The method for transmitting a network video according to claim 4, wherein sending the video request information to the buffer by using a manager further comprises:
  sending, by the manager, the video request information to a buffer with the video resource corresponding to the video identification information and with a lowest load ratio, wherein the manager is further used to obtain the buffer with the lowest load ratio among all buffers that have the video resource corresponding to the video identification information.

8. The method for transmitting a network video according to claim 1, wherein the video request information is sent to the buffer by using a manager, and before sending the video request information to the buffer by using a manager, the method further comprises:

sending, by the terminal device, the video server name information to the local domain name server, so that the local domain name server parses the video server name information to obtain IP address information of the manager; and receiving, by the terminal device, the IP address information of the manager and sent by the local domain name server, and sending the video request information to the manager according to the IP address information of the manager.

9. The method for transmitting a network video according to claim 1, wherein the video request information is sent to the buffer by using a manager, and before sending the video request information to the buffer by using a manager, the method further comprises:

sending, by the terminal device, the video server name information to the local domain name server, so that the local domain name server parses the video server name information to obtain IP address information of the manager; and receiving, by the terminal device, the address information of the manager and sent by the local domain name server, and sending the video request information to the manager according to the address information of the manager.

10. A terminal device, comprising a processor and a communication interface, wherein the processor is configured to:

send video server name information in video request information to a local domain name server by using the communication interface, so that the local domain name server parses the video server name information to obtain Internet Protocol (IP) address information of a buffer corresponding to the video server name information;

receive IP address information of the buffer sent by the local domain name server by using the communication interface;

send the video request information to the buffer according to the IP address information of the buffer by using the communication interface; and when a video resource corresponding to video identification information in the video request information exists in the buffer, receive the video resource corresponding to the video identification information from the buffer by using the communication interface, and when a video resource corresponding to video identification information in the video request information does not exist in the buffer, obtain the video resource corresponding to the video identification information from a video server according to IP address information of the video server and the video identification information in redirection information sent by the buffer by using the communication interface, wherein the redirection information comprises the address information of the video server obtained by the buffer from a secondary domain name server in response to sending the video server name information in video request information to the secondary domain name server.

11. The terminal device according to claim 10, wherein the processor is further configured to receive the redirection information sent by the buffer by using the communication interface.

12. A local domain name server, comprising a processor and a communication interface, wherein the processor is configured to:

receive video server name information sent by a terminal device by using the communication interface;

parse the video server name information to obtain IP address information of a buffer corresponding to the video server name information; and send the IP address information of the buffer to the terminal device by using the communication interface, wherein the buffer receives video request information from the terminal and determines whether a requested video resource exists in the buffer, and when the video resource exists in the buffer, the buffer sends the video resource to the terminal device, and when the video resource does not exist in the buffer, the buffer sends redirection information to the terminal device so that the terminal device can obtain the video resource from a video server according to the redirection information, wherein the redirection information comprises IP address information of the video server obtained by the buffer from a secondary domain name server in response to sending the video server name information in video request information to the secondary domain name server.

13. The local domain name server according to claim 12, the processor is further configured to:

parse the video server name information to obtain the IP address information of a manager.

\* \* \* \* \*